J. Frank.
Cultivator.

Nº 74678. Patented Feb. 18, 1868.

Sheet 2 - 2 Sheets.

Witnesses.

Inventor.
John Frank
Chipman Hosmer & Co
Attys.

United States Patent Office.

JOHN FRANK, OF WEBSTER CITY, IOWA.

*Letters Patent No. 74,678, dated February 18, 1868.*

IMPROVEMENT IN CULTIVATORS.

*The Schedule referred to in these Letters Patent and making part of the same.*

TO WHOM IT MAY CONCERN:

Be it known that I, JOHN FRANK, of Webster City, in the county of Hamilton, and State of Iowa, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

My improvement consists mainly in providing means for adjusting the position of the ploughs in the ground so as to enable the operator to cast the furrow either from the plants or towards them, at will. It also consists in providing better means than have heretofore been devised for raising or lowering the ploughs in the ground or above it; and it also consists in constructing a shovel-plough for the use of cultivators, twisted in the form and shape of the ordinary cast-iron plough.

Figure 1:
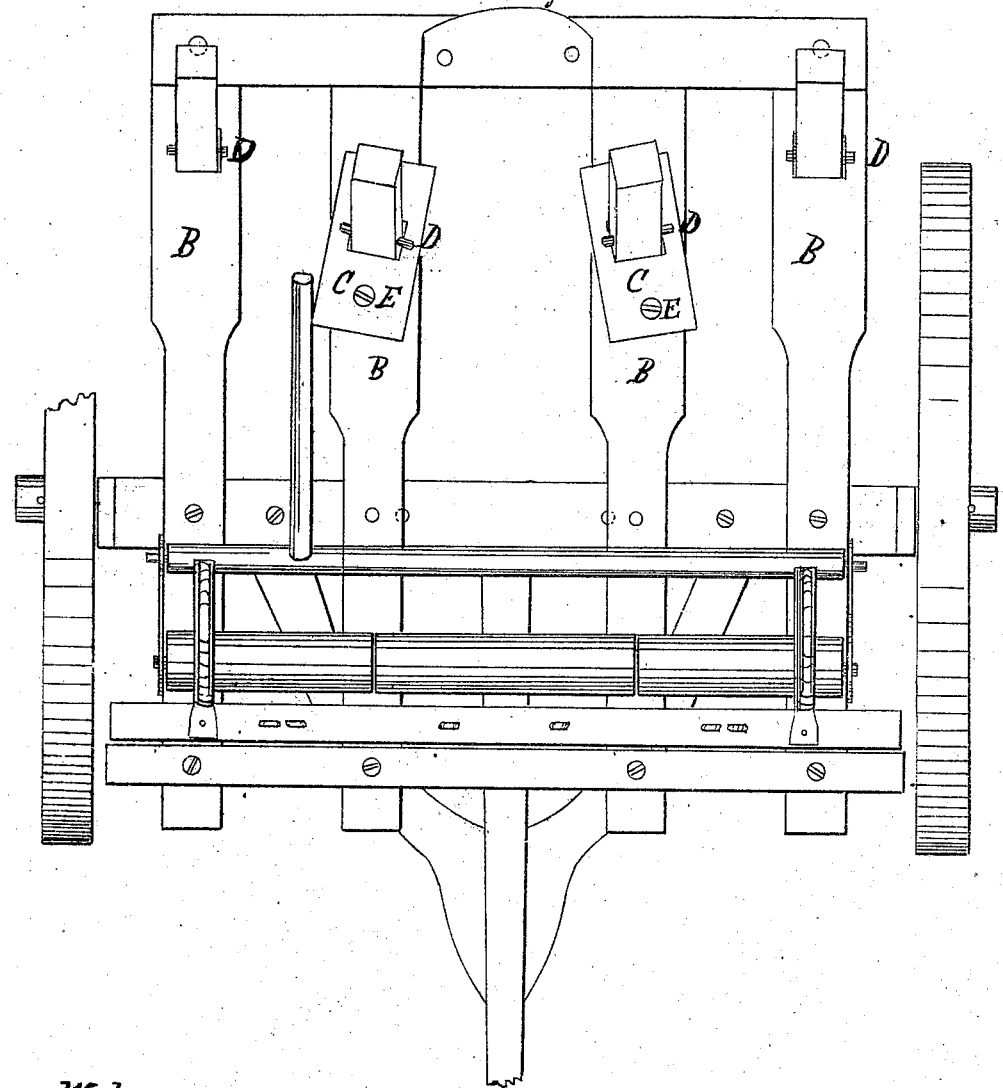
Figures 2, 3:
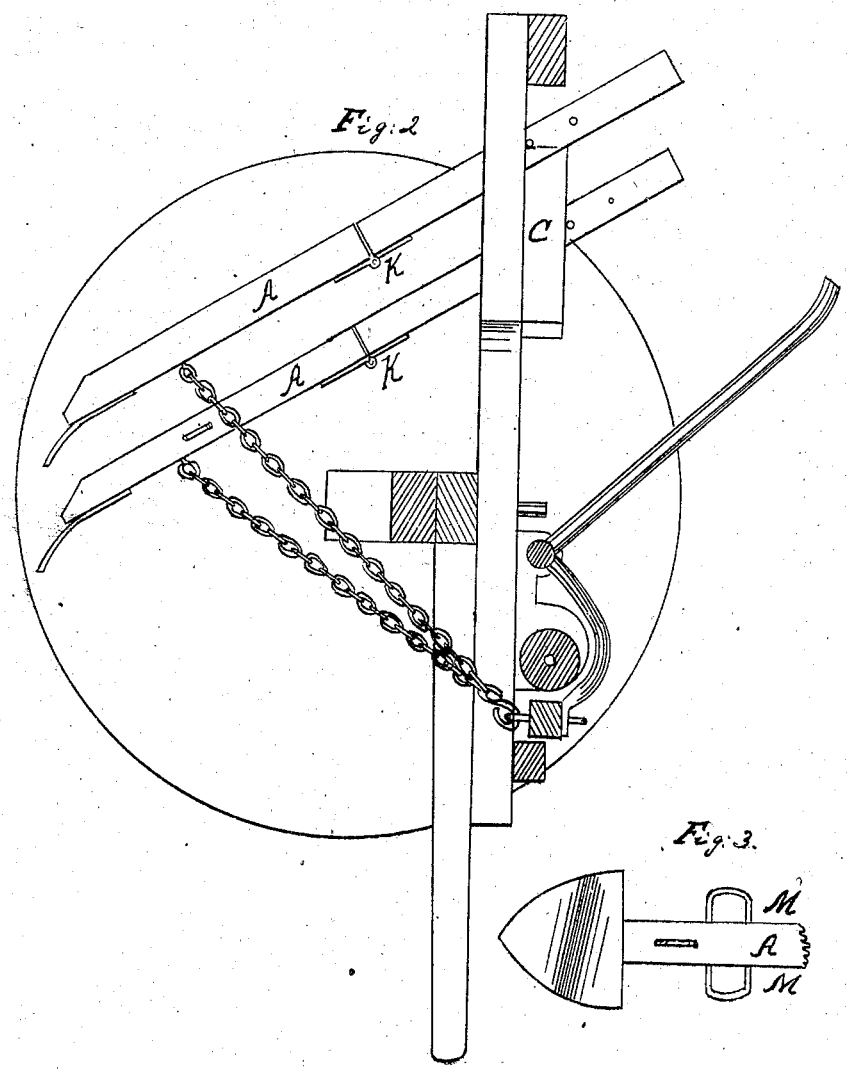

My cultivator is constructed in the usual form of sulky-cultivators, and is provided with four shovel-ploughs, two of which, with the mode of their adjustment, are represented by Figure 2 of the drawings.

The plough-beams or upright arms, to which the ploughs are attached, are marked A. They are made in a four-square form, and pass through openings in the arms B, which openings are made large enough to allow the plough-beams to be turned partly around therein.

Letters C are blocks, that sit on the arms B, and immediately over the openings above mentioned. They are open at their centres sufficiently to admit the plough-beams to pass through them, but the plough-beams are held firmly in said openings. These blocks C have holes for bolts or screws, at each end, corresponding with similar holes in the arms B, and the plough-beams are supported and their height adjusted by means of keys or pins passing through them on the top of the blocks C, as shown by letter D. The bolt or screw-holes, with screws therein, are marked E. My device comprehends the use of two such screws or bolts in each block, one of which is correctly represented on the drawings, and the other is placed at the opposite ends of the blocks respectively. The use and purpose of these blocks C, with the screws and bolts mentioned, and the corresponding screw or bolt-holes in the arms B, are to enable the operator to change the position of the ploughs, so that the furrows shall be turned from the plants or towards them, as the case may require. I also construct my plough-beams with joints, as shown by letter K, and I attach to them stirrups for the foot, as shown by letter m in Figure 3.

My device for lifting the ploughs is the usual lever, roller, and chain-apparatus, but I add thereto the stirrups m, by which the driver can move any particular plough with his foot when necessary in passing an obstruction. These stirrups also enable the driver to press any particular plough down in the ground when it becomes necessary or desirable so to do. The joints in the plough-beams also afford means for raising the ploughs more readily, and also facilitate the passage of obstructions. My shovel-ploughs are sometimes conructed with a twist, and thereby assume the shape and perform the functions somewhat of the ordinary cast-iron plough.

What I claim as my invention, and desire to secure by Letters Patent, is—

1. The adjustable blocks C, constructed and operating substantially as described.

2. I claim the cultivator as it stands, with its various parts and devices, combined, arranged, and operating substantially as and for the purposes herein specified.

JOHN FRANK.

Witnesses:
WM. A. CROSLEY,
DAVID BEACH.